UNITED STATES PATENT OFFICE.

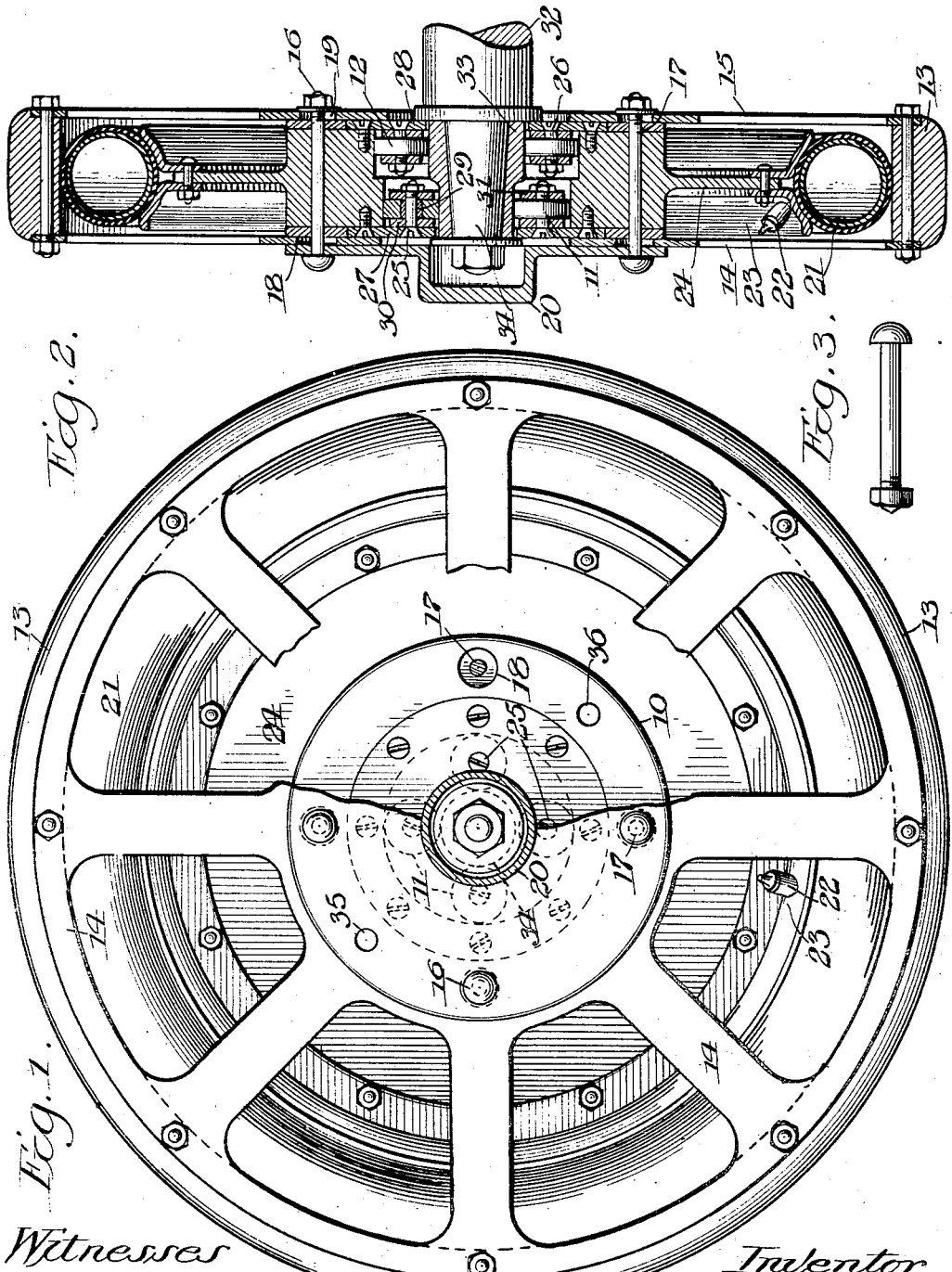

GEORGE A. MORFOOT, OF CHICAGO, ILLINOIS.

VEHICLE-WHEEL.

1,172,625.  Specification of Letters Patent.  Patented Feb. 22, 1916.

Application filed July 6, 1914. Serial No. 849,321.

*To all whom it may concern:*

Be it known that I, GEORGE A. MORFOOT, a citizen of the United States, and resident of Chicago, county of Cook, and State of Illinois, have invented certain new and useful Improvements in Vehicle-Wheels, of which the following is a specification and which are illustrated in the accompanying drawings, forming a part thereof.

The invention relates to that type of vehicle wheels which, while having a solid tread portion, are provided with cushioning means between the tread or rim and the hub.

The object of the invention is to provide a simple, practicable and efficient wheel of this type; and the invention consists in a structure such as is hereinafter described, and is illustrated in the accompanying drawings, in which—

Figure 1 is a side elevation of the wheel, some portions being broken away; Fig. 2 is a central axial sectional view thereof; and Fig 3 shows one of the bolts used for locking the tread and hub portions together.

The hub portion of the wheel comprises an annulus 10, preferably of wood, and which incloses and carries suitably united anti-friction rollers, as 11, 12, as many being used as may be deemed advisable, which run upon the axle. The tread portion of the wheel 13 is annular in form, and may be of metal or wood, as may be preferred. A pair of side plates 14, 15, are secured rigidly to the tread portion or rim 13, and extend inwardly and overlap and slidingly engage the annulus 10. These parts are held in sliding engagement by means of bolts 16, 17, shown as four in number, these bolts fitting snugly in apertures in the member 10 and passing loosely through apertures 18, 19, in the plates 14, 15. These apertures are of sufficient size to permit the desired range of movement of the united parts. A hub cap 20 may be held in place also by the same bolts.

A tube 21, adapted to be inflated with air through a suitable nipple 22, rests upon an annular channeled seat 23, carried by a disk 24 extending radially from the member 10, this tube bearing upon the inner face of the tread portion or rim 13. The rollers 11, 12, are mounted upon stub shafts 25, 26, which may be and are shown as screws setting through side plates 27, 28, secured to and extending inwardly from the member 10, these screws carrying bushings 29 upon which the rollers 11, 12, may turn, and nuts 30, 31, being mounted upon the screws at each side of each of the rollers to prevent lateral movement thereof.

In order to adapt the wheel for use upon any particular axle, as 32, a sleeve 33 may be fitted upon the axle skein 34, its periphery being provided with bearing surfaces of uniform diameter for the rollers.

The plates 14, 15, may be apertured in order to reduce the weight, as plainly shown. The tube 21 provides the same cushioning action as is secured in the ordinary pneumatic tire, but is protected from wear and injury by the solid tread portion 13. It may therefore, be made much lighter than the casing of a pneumatic tire which constitutes the tread portion of a wheel. Broadly considered, the wheel as described is of the ordinary pneumatic tire type, with a solid protecting rim fitted upon the outer face of the cushioning tube.

Provision is made for temporarily locking the tread and hub portions rigidly together should the tube become deflated. This feature consists in providing the plates 14, 15, and the member 10 with two or more registering apertures 35, 36, through which bolts may be passed for securing these parts together. When such bolts are applied the wheel is, of course, without cushioning action but will support the vehicle and permit it to be driven to a suitable place for making repairs.

I claim as my invention—

1. In a wheel of the class described, a hub member provided between its ends with a circumscribing radial flange, cushion seating members secured to the said flange, a cushion supported by said seating members, a tread member surrounding the said cushion, side plates secured to the opposite sides of the said tread member and fitting slidably against the end faces of the said member, the said plates being provided each with a series of openings, bolts fitted through the hub member and projecting at their ends through the said openings in the said plates, and a hub cap plate supported by the said bolts in spaced relation to one end of the said hub member and bearing against one face of one of said side plates.

2. In a wheel of the class described, a hub member provided between its ends with a circumscribing radial flange, cushion seating members secured to the opposite sides of the said flange at the marginal portion thereof, a pneumatic cushion surrounding and seating upon the said seating members, a rigid tread member surrounding the said cushion, annular side plates secured at their outer marginal portions to the opposite sides of the said tread member and at their inner portions fitting slidably against the end faces of the said hub member, the said plates being provided each with a series of openings, bolts fitted through the hub member and projecting at their ends through the said openings in the said plates, and a hub cap plate supported by the said bolts in spaced relation to the outer end of the said hub member and bearing against the outer face of the outer one of the said side plates.

GEORGE A. MORFOOT.

Witnesses:
E. M. KLATCHER,
O. M. WERMICH.